J. D. REDMAN.
SHOVEL.
APPLICATION FILED JULY 24, 1916.
1,225,680.
Patented May 8, 1917.
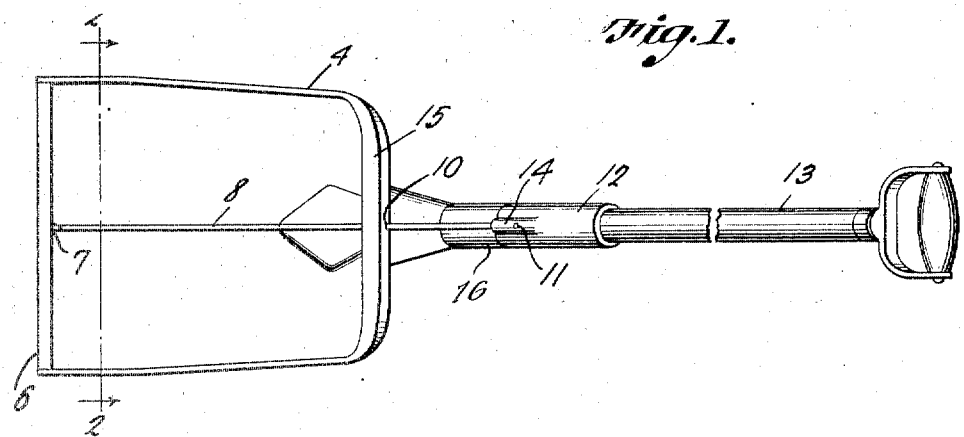
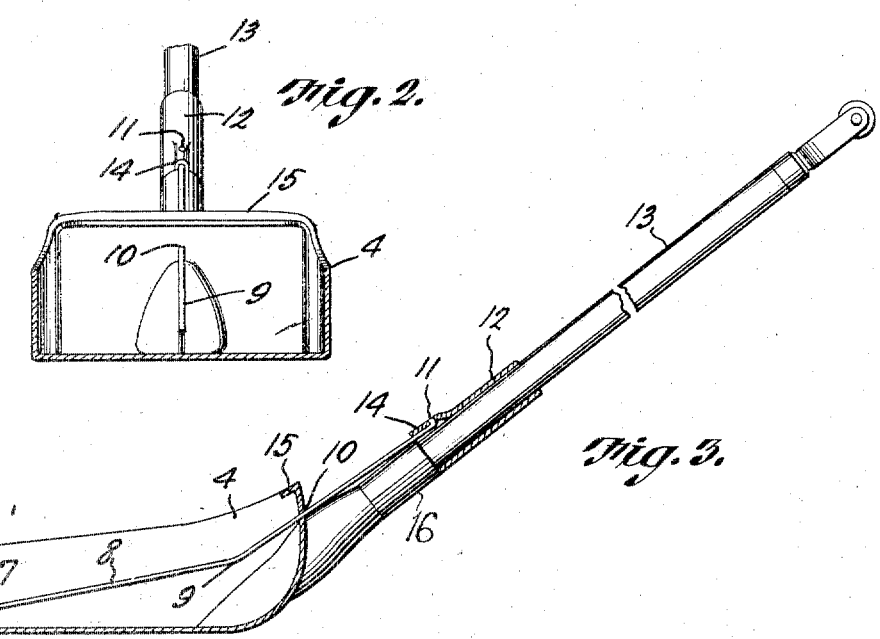
Inventor,
John D. Redman,
By Frank S. Anderway
Attorney

UNITED STATES PATENT OFFICE.

JOHN D. REDMAN, OF FILLMORE, NEW YORK.

SHOVEL.

1,225,680.  Specification of Letters Patent.  Patented May 8, 1917.

Application filed July 24, 1916.  Serial No. 110,923.

*To all whom it may concern:*

Be it known that I, JOHN D. REDMAN, a citizen of the United States of America, and resident of Fillmore, in the county of Allegany and State of New York, have invented certain new and useful Improvements in Shovels, of which the following is a specification.

This invention relates to shovels and particularly to shovels for use in connection with the removal of solid and liquid matter or semi-solid matter, the said invention having novel means for permitting the use of the shovel while the same is being forced under the material to be removed so that the said material may readily pass on the shovel, novel means being provided for guarding the end of the shovel to prevent the escape of the material so deposited.

A further object of this invention is to provide a shovel having side walls and a rear wall, and a gate hinged at the front of the shovel adapted to close the space between the side walls, the said shovel having novel means by which the gate is operated so that it may be conveniently opened and positively closed according to the requirements in operation.

A still further object of this invention is to provide a shovel having a rear wall constituting a guide for an opening and closing rod by which the gate is actuated and the provision of means on the handle of the shovel for communicating motion to the said rod.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a plan view of a shovel embodying the invention;

Fig. 2 illustrates a sectional view on the line 2—2 of Fig. 1; and

Fig. 3 illustrates a longitudinal sectional view of the said shovel with the handle in elevation.

In these drawings 4 denotes the blade of bowl of the shovel including the sides and rear end, the said sides supporting at the outer upper edge a pivot 5 on which the gate 6 is mounted to swing inwardly.

The gate 6 has an eye 7 on its inner surface to which the rod 8 is pivotally connected, the said rod having a bend 9 so that a portion of the rod may extend at an angle to the other portion thereof. The inner end of the rod is slidable through an aperture 10 in the rear wall of the shovel and terminates in a shoulder or hook 11.

A collar 12 is mounted to slide on the handle 13 of the shovel and the said collar has an aperture 14 for the reception of the hook 11 of the rod 8.

By reason of the construction just described, it will be apparent that manipulation of the collar 12 longitudinally of the handle will result in a reciprocation of the rod 8 and hence the oscillation of the gate 6 so that the gate may move to the position shown in Fig. 3 of the drawing or it may be drawn inwardly to form a clearance so that material may enter the bowl of the shovel when properly manipulated and after the contents has reached the bowl, the gate may be manipulated so that it will close the end of the shovel and prevent the escape of the said material. The rear wall of the shovel has an overhanging flange 15 to prevent splashing of the liquid contents of the shovel.

The advantages of the construction and the many instances of its utility will, it is thought, be apparent to those skilled in the art.

The bowl of the shovel has a rearward extension 16 constituting a socket for the handle and this extension also forms a stop of abutment for the sliding collar, thus limiting the movement of the collar and preventing the door from swinging unduly.

I claim:

In a shovel, a bowl having a rear and side walls, a handle for the said bowl, a gate at the front of the shovel to close the space between the side walls, means at the upper corners of the said gate for hinging it to the side walls of the shovel, said shovel having an opening forming a guide, a rod slidable in the said opening, said rod having a portion of its length lying parallel to the handle of the shovel and the forward end standing at an angle thereto, means for pivoting the forward end to the said gate, a collar slidable on the handle, means for pivotally connecting the said collar to the said rod, and means for limiting the movement of the said collar.

JOHN D. REDMAN.

It is hereby certified that in Letters Patent No. 1,225,680, granted May 8, 1917, upon the application of John D. Redman, of Fillmore, New York, the title of invention was erroneously written and printed "Shovels," whereas said title should have been written and printed *Sanitary Dairy Shovels;* and that the said Letters Patent should be read with this correction therein that the same may conform to the record of the case in the Patent Office.

Signed and sealed this 26th day of June, A. D., 1917.

[SEAL.]

F. F. WHITEHEAD,

*Acting Commissioner of Patents.*

Cl. 55—14.